United States Patent
Schüle et al.

(10) Patent No.: US 9,758,152 B2
(45) Date of Patent: Sep. 12, 2017

(54) METHOD FOR OPERATING A HYBRID DRIVE DEVICE AND CORRESPONDING HYBRID DRIVE DEVICE

(71) Applicant: AUDI AG, Ingolstadt (DE)

(72) Inventors: Florian Schüle, Ebersbach (DE); Andreas Göbel, Burgheim (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/032,762

(22) PCT Filed: Oct. 29, 2014

(86) PCT No.: PCT/EP2014/002903
§ 371 (c)(1),
(2) Date: Apr. 28, 2016

(87) PCT Pub. No.: WO2015/062721
PCT Pub. Date: May 7, 2015

(65) Prior Publication Data
US 2016/0339899 A1     Nov. 24, 2016

(30) Foreign Application Priority Data
Oct. 29, 2013 (DE) .................. 10 2013 017 946

(51) Int. Cl.
*B60W 20/00* (2016.01)
*B60W 10/06* (2006.01)
(Continued)

(52) U.S. Cl.
CPC ............... *B60W 20/10* (2013.01); *B60K 6/46* (2013.01); *B60K 6/48* (2013.01); *B60W 10/06* (2013.01);
(Continued)

(58) Field of Classification Search
USPC ........................................... 701/22
See application file for complete search history.

(56) References Cited

U.S. PATENT DOCUMENTS 8,187,146 B2 * 5/2012 Allgaier .................. B60K 6/48
180/65.28
8,591,361 B2 * 11/2013 Hisada ................... B60K 6/387
180/65.235
(Continued)

FOREIGN PATENT DOCUMENTS

DE 102008002383 A1 12/2009
DE 102008064291 A1 7/2010
(Continued)

OTHER PUBLICATIONS

International Search Report issued by the European Patent Office in International Application PCT/EP2014/002903.

*Primary Examiner* — Tyler J Lee
(74) *Attorney, Agent, or Firm* — Henry M. Feiereisen LLC

(57) ABSTRACT

A method for operating a hybrid drive device, which includes a first drive unit and a second drive unit is disclosed, wherein a drive torque of the hybrid drive device is produced only by means of the first drive unit in a first operating mode and is produced jointly by the first drive unit and the second drive unit in a second operating mode, and wherein an actual rotational speed of the second drive unit is brought into line with a target rotational speed upon a switchover from the first operating mode to the second operating mode. In order to bring the actual rotational speed into line, a target rotational speed gradient is determined and a target torque determined on the basis of the target rotational speed gradient is set at the second drive unit.

3 Claims, 2 Drawing Sheets

(51) Int. Cl.
*B60K 6/46* (2007.10)
*B60W 10/08* (2006.01)
*B60W 20/10* (2016.01)
*B60W 20/40* (2016.01)
*B60K 6/48* (2007.10)
*B60W 50/00* (2006.01)
*F02N 11/08* (2006.01)

(52) U.S. Cl.
CPC ............ *B60W 10/08* (2013.01); *B60W 20/40* (2013.01); *B60W 2050/0008* (2013.01); *B60W 2510/0652* (2013.01); *B60W 2510/0695* (2013.01); *B60W 2710/0644* (2013.01); *B60W 2710/0666* (2013.01); *B60Y 2200/92* (2013.01); *B60Y 2300/182* (2013.01); *B60Y 2300/43* (2013.01); *F02N 11/0818* (2013.01); *Y10S 903/93* (2013.01)

(56) References Cited

U.S. PATENT DOCUMENTS

| 8,618,752 | B2* | 12/2013 | Zing | B60L 15/2045 180/65.22 |
|---|---|---|---|---|
| 2006/0276288 | A1* | 12/2006 | Iwanaka | B60K 6/365 475/5 |
| 2007/0275818 | A1* | 11/2007 | Kouno | B60K 6/48 477/3 |
| 2007/0287564 | A1* | 12/2007 | Cho | B60K 6/365 475/5 |
| 2008/0039261 | A1* | 2/2008 | Cho | B60K 6/365 475/5 |
| 2008/0064561 | A1* | 3/2008 | Popp | B60K 6/48 477/5 |
| 2009/0063000 | A1* | 3/2009 | Kodama | B60W 30/16 701/75 |
| 2009/0312143 | A1* | 12/2009 | Allgaier | B60K 6/365 477/5 |
| 2009/0312144 | A1 | 12/2009 | Allgaier | |
| 2010/0250037 | A1 | 9/2010 | Yoshida | |
| 2012/0019172 | A1* | 1/2012 | Zing | B60L 15/2045 318/8 |
| 2013/0012353 | A1* | 1/2013 | Yoshida | B60K 6/48 477/5 |
| 2013/0184920 | A1 | 7/2013 | Otsubo | |
| 2014/0100732 | A1* | 4/2014 | Zing | B60L 15/2045 701/22 |
| 2016/0129811 | A1* | 5/2016 | Zing | B60L 15/2045 701/22 |

FOREIGN PATENT DOCUMENTS

| DE | 102010030800 A1 | 1/2012 |
|---|---|---|
| DE | 112010005907 T5 | 7/2013 |
| DE | 11201000043 T5 | 8/2013 |
| DE | 102012003020 A1 | 8/2013 |
| DE | 102012018222 A1 | 3/2014 |
| EP | 1925521 A2 | 5/2008 |

* cited by examiner

METHOD FOR OPERATING A HYBRID DRIVE DEVICE AND CORRESPONDING HYBRID DRIVE DEVICE

CROSS-REFERENCES TO RELATED APPLICATIONS

This application is the U.S. National Stage of International Application No. PCT/EP2014/002903, filed Oct. 29, 2014, which designated the United States and has been published as International Publication No. WO 2015/062721 and which claims the priority of German Patent Application, Serial No. 10 2013 017 946.7, filed Oct. 29, 2013, pursuant to 35 U.S.C. 119(a)-(d).

BACKGROUND OF THE INVENTION

The invention relates to a method for operating a hybrid drive device having a first drive aggregate and a second drive aggregate, wherein in a first operating mode a drive torque of the hybrid drive device is solely generated by the first drive device and in a second operating mode jointly by the first drive aggregate and the second drive aggregate, and wherein when switching from the first operating mode to the second operating mode an actual rotational speed of the second drive aggregate is adjusted to a target rotational speed. The invention also relates to a hybrid drive device.

The hybrid drive device has at least two drive aggregates, i.e., the first drive aggregate and the second drive aggregate. As drive aggregates, electric machines, internal combustion engines or the like can be provided in any combination. For example the first drive aggregate can be an electric machine and the second drive aggregate an internal combustion engine. In the first operating mode the drive torque is solely provided by the first drive aggregate. This means that the second drive aggregate is deactivated and/or decoupled from the first drive aggregate. Correspondingly no operative connection is present between the first drive aggregate and the second drive aggregate. When the first drive aggregate is configured as electric machine, the hybrid drive device is operated purely electrically in the first operating mode, in particular the motor vehicle which has the hybrid drive is driven purely electrically.

In the second operating mode on the other hand the first drive aggregate and the second drive aggregate jointly generate the drive torque. This means that the first drive aggregate as well as the second drive aggregate each provide a portion of the drive torque that is different from zero. Usually however the second drive aggregate is deactivated in the first operating mode or has at least only a low rotational speed, in particular a lower rotational speed than the first drive aggregate. It is thus necessary to adjust the actual rotational speed of the second drive aggregate to the target rotational speed when switching from the first operating mode to the second operating mode. The target rotational speed is preferably a rotational speed at which the second drive aggregate has to be operated in order to be coupled with the first drive aggregate, in particular without sacrificing comfort. The target rotational speed for example corresponds to the actual rotational speed of the first drive aggregate, in particular taking a transmission ratio of a transmission that may be arranged between the first drive aggregate and the second drive aggregate into account.

From the state-of-the-art for example the patent document DE 10 2008 002 383 A1 is known which describes a method for controlling a hybrid drivetrain of a motor vehicle. Further a method for electronic control of the rotational speed of at least one drive motor of a motor vehicle is described in reference DE 10 2012 018 222 A1. Hereby the rotational speed differential between a predetermined target rotational speed and an actual rotational speed of the drive motor and the rotational speed gradient differential according to value and direction and/or the actual and/or target rotational speed gradient according to value and direction are used for determining at least one control parameter which influences the feedback control of the rotational speed in a feedback control model, wherein the feedback control model determines a P-component and an I-component, wherein prior to adding up the components a correction factor is applied to the determined P-component, which factor is dependent on the state of the drive motor. Also known from the state-of-the-art further are the references DE 10 2012 003 020 A1, DE 11 2010 005 907 T5 and DE 11 2010 000 430 T5.

SUMMARY OF THE INVENTION

It is an object of the invention to propose a method for operating a hybrid drive device, which has advantages compared to the state-of-the-art, and which in particular enables switching from the first operating mode to the second operating mode fast and with high comfort.

According to the invention this is achieved with a method with the features of the independent method claim. Hereby it is provided that for adjusting the actual rotational speed, a target rotational speed gradient is determined, and a target torque, which is determined based on the target rotational speed gradient, is set at the second drive aggregate, wherein the target torque is determined by means of a feedback control from the target rotational speed gradient, and wherein the feedback control includes a pre-control, wherein the target torque is determined from the inertia moment and the target rotational speed gradient. The second drive aggregate, in particular the internal combustion engine, is preferably activated situation-dependent with different demands on the duration of activation and comfort. Important for the duration of activation is the rotational speed gradient during adjustment of the actual rotational speed of the second drive aggregate. The greater the rotational speed gradient, the faster the actual rotational speed reaches the desired target rotational speed. On the other hand a small rotational speed gradient results in increased comfort, in particular when the rotational speed gradient is selected relatively small when the actual rotation speed has almost reached the target rotational speed.

For this reason the target rotational speed gradient is first determined, which enables or is used for adjustment of the actual rotation speed to the target rotational speed. Based on this target rotational speed gradient the target torque is then determined and set at the second drive aggregate. The target torque is in so far a function of the selected target rotational speed gradient. For example the target rotational speed gradient is only selected once at the beginning of the switching, and is subsequently constant until completion of the switching i.e., until reaching the second operating mode or until the actual rotational speed reaches the target rotational speed. The determining of the target torque from the target rotational speed gradient ensures that the actual rotational speed can be adjusted to the target rotational speed sufficiently quickly and with high comfort, i.e., in particular without causing jolting. Of course the target rotational speed gradient can alternatively also be determined multiple times, for example in dependence on the actual rotational speed or the difference between the target rotational speed and the actual rotational speed.

After setting the target torque at the second drive aggregate the second drive aggregate is preferably adjusted by closed loop and/or open loop control so that the actual torque corresponds to the target torque. Preferably the second drive aggregate or the actual torque of the second drive aggregate is adjusted to the target torque by feedback control.

The target torque is determined from the target rotational speed gradient by means of a feedback control. The target torque is the thus set so that the actual rotational speed gradient resulting from the actual torque corresponds to the target rotational speed gradient or approximates the target rotational speed gradient. The target rotational speed gradient corresponds insofar to a command variable, the target torque to a manipulated variable and the actual torque or the actual rotational speed gradient determined from the actual torque corresponds to a controlled variable of a control loop of the hybrid drive device. From the target rotational speed gradient and the actual rotational speed gradient for example a control deviation is determined, which is in particular a difference between the target rotational speed gradient and the actual rotational speed gradient. This control deviation is received as input by a controller or a controlling element. The latter then determines the required manipulated variable or the required target torque in order to adjust the actual rotational speed gradient to the target rotational speed gradient.

It is further provided that the regulation includes a pre-control, wherein the target torque is determined from the inertia moment and the target rotational speed gradient. Beside the controller or the at least one controlling element thus a pre-control is provided by means of which the target torque is selected independent of the control deviation. Particularly preferably the target torque which results from the pre-control, is a function of the target rotational speed gradient. As a further input variable, which is in particular constant, the inertia moment in particular of the second drive aggregate is used. In the pre-control the target rotational speed gradient can be determined by the relationship $$M = J \cdot w^*$$

wherein M is the target torque, J the inertia moment and w* the target rotational speed gradient. In order to compensate residual tolerances, at least one of the aforementioned controlling elements can then be used, in particular the P-controlling-element. Preferably after the pre-control during which the target torque was determined the target torque is adjusted during the feedback control based on the present system deviation.

A preferred embodiment of the invention provides that the feedback control has at least one P-controlling-element, I-controlling-element and/or a D-controlling-element. The feedback control or the controller has at least one controlling element, which can assume the mentioned configurations. Of course also multiple controlling elements can be provided so that insofar a P-controller, I-controller, PI-controller, PD-controller or PID-controller is present. Particularly preferably, only a P-controlling-element is provided so that a P-controller is realized. Alternatively a P-controlling-element and an I-controlling-element and thus a PI-controller is provided.

Finally the target rotational speed can be selected once at the beginning of the adjustment or multiple times during the adjustment in particular in dependence on the actual rotational speed of the second drive aggregate. For example the target rotational speed gradient is an invariable constant. However, it can also be provided to select the target rotational speed gradient from a plurality of target rotational speed gradients at the beginning of the adjustment. For example the plurality of the target rotational speed gradients includes different driving dynamics stages, wherein a first target rotational speed gradient is assigned to a first driving dynamics stage, a second target rotational speed gradient is assigned to a second driving dynamics stage and a third target rotational speed gradient is assigned to a third driving dynamics stage, wherein the first target rotational speed gradient is smaller than the second target rotational speed gradient and the second target rotational speed gradient is smaller than the third target rotational speed gradient. Insofar the first driving dynamics stage is a comfort stage, the second driving dynamics stage is a dynamic stage and the third driving dynamics stage is a sporty stage. The target rotational speed gradient is for example maintained during the entire adjustment, i.e., until the switching from the first operating mode to the second operating mode is complete. Alternatively the target rotational speed gradient may also be determined multiple times, in particular in dependence on the selected driving dynamics stage and the actual rotational speed or the difference between the target rotational speed and the actual rotational speed.

Alternatively it can be provided to determine the target rotational speed gradient multiple times, for example once at the beginning and at least one more time during the adjustment. This is for example performed in dependence on the actual rotational speed of the second drive aggregate, wherein the target rotational speed gradient is reduced the more, the smaller the difference between the target rotational speed and the actual rotational speed of the second drive aggregate is.

The invention also relates to a hybrid drive device, in particular for implementing the method according to the description above, with a first drive aggregate and a second drive aggregate, wherein in a first operating mode the hybrid drive device is configured to generate a drive torque of the hybrid drive device solely by means of the first drive aggregate and in a second operating mode jointly by means of the first drive aggregate and the second drive aggregate, wherein when switching from the first operating mode to the second operating mode an actual rotational speed of the second drive aggregate is adjusted to a target rotational speed. Hereby the hybrid drive device is configured for adjusting the actual rotational speed, to determine a target rotational speed gradient and to set a target torque determined based on the target rotational speed gradient at the second drive aggregate, wherein the target torque is determined by means of feedback control from the target rotational speed gradient and wherein the feedback control includes a pre-control, wherein the target torque is determined from the inertia moment and the target rotational speed gradient. The advantages of such a configuration of the hybrid drive device or such a process have already been discussed. The hybrid drive device and the method can be refined according to the description above, so that reference is made to this description.

BRIEF DESCRIPTION OF THE DRAWING

In the following the invention is explained in more detail by way of exemplary embodiments shown in the drawing without limiting the invention. It is shown in.

DETAILED DESCRIPTION OF PREFERRED EMBODIMENTS

Figure 1:
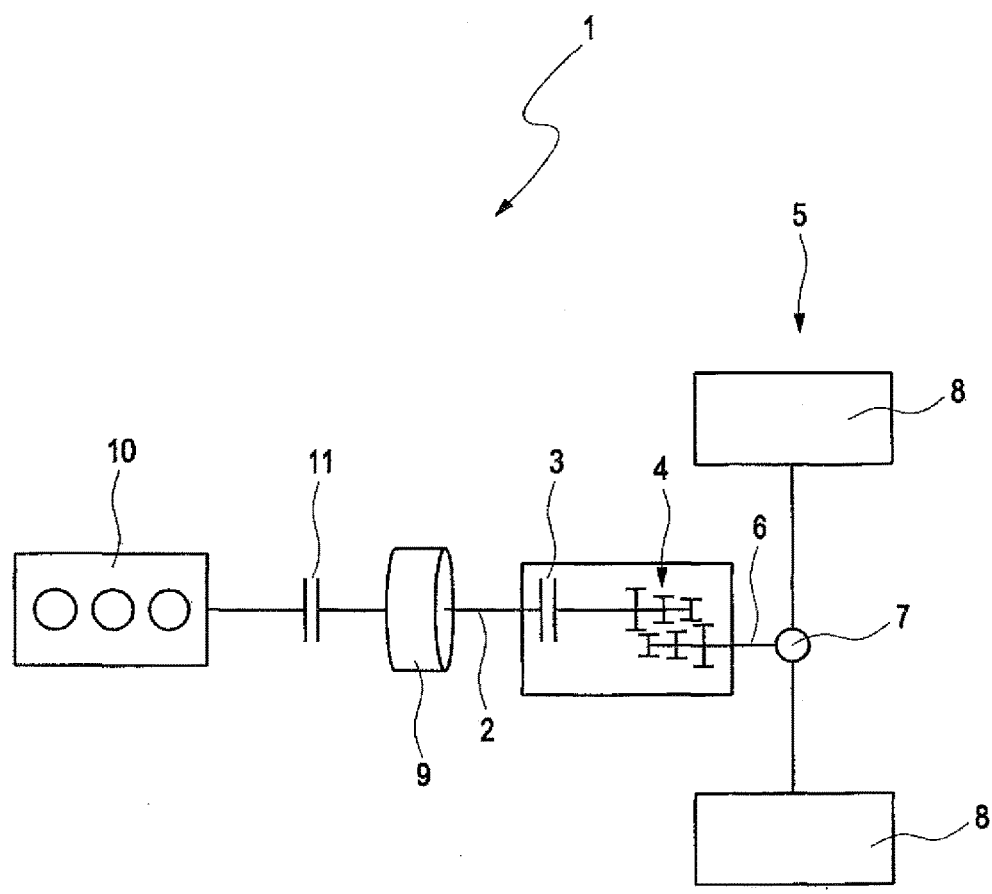
FIG. 1 a schematic representation of the hybrid drive device.

FIG. 1 shows a schematic representation of a hybrid drive device 1 with a drive shaft 2, which is for example connected to an axle 5 of a here not shown motor vehicle via a clutch 3, in particular a starting clutch, and/or a transmission 4, in particular a manual transmission. At an output shaft 6 of the transmission 4 an axle differential 7 is present by means of which a torque provided at the drive shaft 2 or the output shaft 6 is distributed to the wheels 8 of the axle 5 of the motor vehicle.

The hybrid drive device 1 has a first drive aggregate 9 and a second drive aggregate 10. For example the first drive aggregate is directly arranged on the output shaft 2 of the hybrid drive device 1, i.e., is permanently operatively connected with it. The operative connection between the output shaft 2 and the second drive aggregate 10 can include a separating clutch 11 by means of which the operative connection between the second drive aggregate 10 on one hand and the output shaft 2 or the first drive aggregate 9 on the other hand can be interrupted or established. The first dive aggregate 9 is for example an electric machine while the second drive aggregate 10 is an internal combustion engine.

In a first operating mode of the hybrid drive device a drive torque at the output shaft 2 of the hybrid drive device is to be generated solely by means of the first drive aggregate 9. In the second operating mode on the other hand the drive torque is generated jointly by the first drive aggregate 9 and the second drive aggregate 10 so that both provide a portion of the drive torque different from zero. In the first operating mode the separating clutch 11 is insofar preferably open, while in the second operating mode it is at least partially, in particular completely, closed. The term completely closed means a state of the separating clutch 11 in which no clutch slip occurs.

In the first operating mode the second drive aggregate 10 is usually deactivated, i.e., it has a rotational speed of zero, or is at most operated with a low rotational speed, in particular a rotational speed smaller than the rotational speed of the first drive aggregate 9. In the latter embodiment of course a transmission, which may be present between the drive aggregate 9 and the output shaft 2 has to be taken into account. When switching from the first operating mode to the second operating mode an actual rotational speed of the second drive aggregate 10 has to be adjusted to a target rotational speed. In the here shown exemplary embodiment this target rotational speed corresponds to the actual rotational speed of the output shaft 2 or the first drive aggregate 9. Of course also other embodiments can be realized in which the target rotational speed may have to be selected differently.

Figure 2:
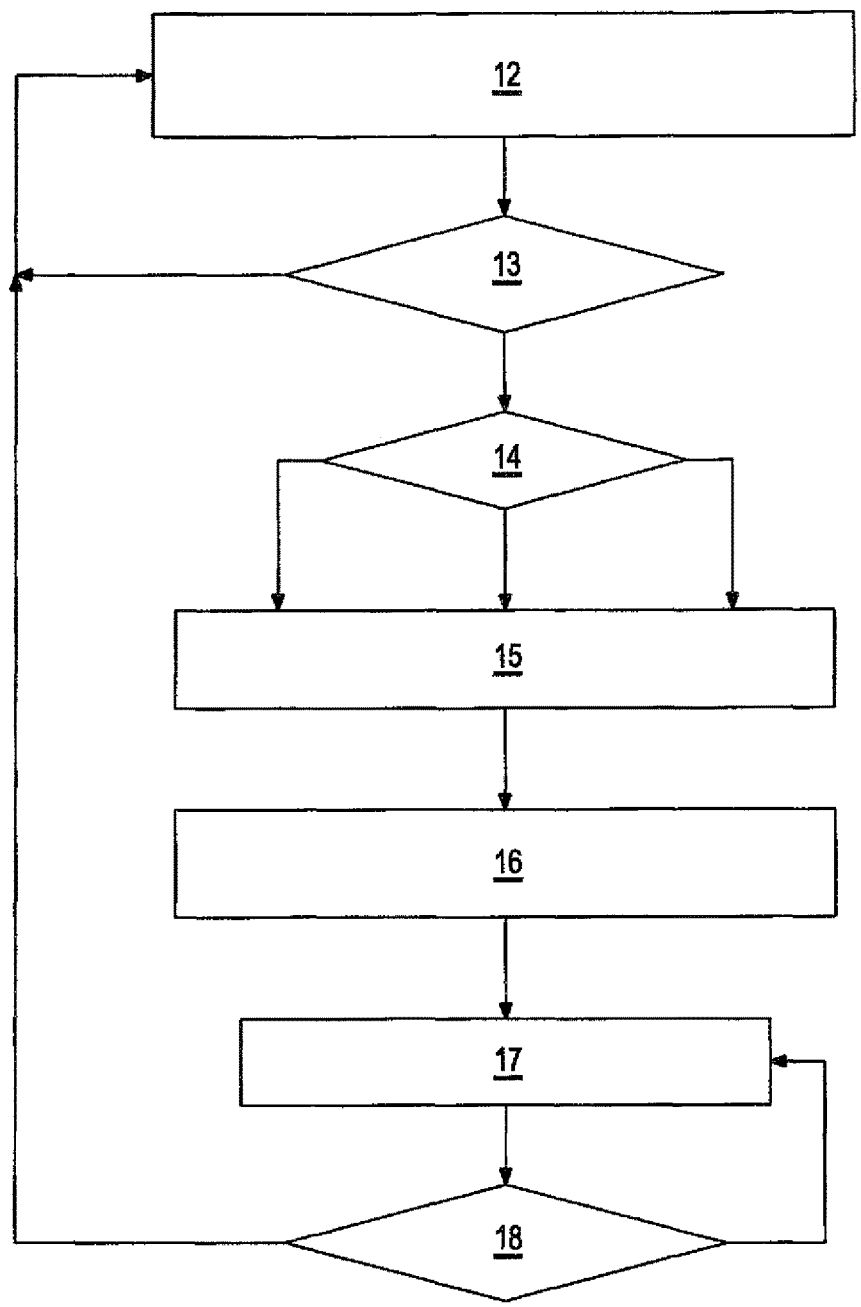
FIG. 2 a schematic diagram of a method for operating the hybrid drive device.

FIG. 2 shows a schematic diagram of a method for operating the hybrid drive device 1. In an operation 12 the hybrid drive device 1 is operated in the first operating mode in which the drive torque is solely provided by the first drive aggregate 9. The second drive aggregate 10 is hereby preferably deactivated. During a query 13 it is decided whether the second drive aggregate 10 is to be activated, i.e., whether a change from the first operating mode into the second operating mode has to be performed. When the switching has to be performed the desired driving dynamic stage is selected in a query 14. For example three different driving dynamic stages are provided.

In the following a target rotational speed gradient is determined in an operation 15, in particular based on the driving dynamics stage. Of course the query 14 can also be omitted and always a constant target rotational speed gradient can be used. In an operation 16 a target torque is then determined from the target rotational speed gradient and set at the second drive aggregate 10. Preferably a feedback control hereby occurs of an actual rotational speed gradient resulting from the actual rotational speed of the second drive aggregate 10 to the prior selected target rotational speed gradient. This is for example provided by means of a P-controller, which insofar has a P-controlling element.

In addition a pre-control can be provided in which the target torque is determined from the inertia moment of the second drive aggregate 10 and the target rotational speed gradient. As soon as the actual rotational speed of the second drive aggregate 10 has reached the target rotational speed it is advanced form operation 16 to operation 17. In this operating the second operating mode of the hybrid drive device 1 is present. Subsequently it is periodically tested in a query 18 whether the second operating mode is to be continued or whether the second drive aggregate 10 is to be decoupled or deactivated. In the first case the sequence branches off to operation 17, in the latter case to operation 12. Correspondingly the method starts anew form the beginning.

By means of the method described above a very fast yet comfortable adjustment of the actual rotational speed of the second drive aggregate 10 to the target rotational speed is possible. In particular it is not required to determine the target torque with characteristic fields at which the desired rotational speed gradient can be at least approximately obtained. Rather the actual rotational speed gradient is adjusted to the target rotational speed gradient by a feedback control. At least however the target torque is determined from the prior selected target rotational speed gradient and then set at the drive aggregate 10.

What is claimed is:

1. A method for operating a hybrid drive device with a first drive aggregate and a second drive aggregate, said method comprising:

switching from a first operating mode of the hybrid drive device to a second operating mode of the drive device, wherein in the first operating mode a torque of the hybrid drive device is solely generated by means of the first drive aggregate and in the second operating mode jointly by the first drive aggregate and the second drive aggregate;

when switching from the first operating mode to the second operating mode, adjusting an actual rotational speed of the second drive aggregate to a target rotational speed with a predetermined rotational speed gradient, said target rotational speed gradient being determined multiple times during different driving dynamic stages, thereby defining a first target rotational speed gradient assigned to a first driving dynamic stage, a second target rotational speed gradient assigned to a second driving dynamic stage and a third target rotational speed gradient assigned to a third driving dynamic stage, with the first target rotational speed gradient being smaller than the second target rotational speed gradient, and the second target rotational speed gradient being smaller than the third target rotational speed gradient and the first, second and third target rotational speed gradients differing between the first, second and third dynamic stages, wherein for adjusting the actual rotational speed to the target rotational speed a target torque is set at the second drive aggregate, said target torque being determined as a function of the predetermined rotational speed gradient by way of a feedback control, said feedback control including a pre-control in which the target torque of the second drive aggregate is determined as a function of an inertia moment of the second drive aggregate and the predetermined rotational speed gradient, wherein the feedback control includes at least one of a P-controlling element, an I-controlling element and a D-controlling element.

2. The method of claim 1, wherein the target rotational speed gradient is selected in dependence on the actual rotational speed of the second drive aggregate.

3. A hybrid drive device, comprising:

a first drive aggregate and a second drive aggregate, said hybrid drive device being configured to generate in a first operating mode a drive torque of the hybrid drive device solely by means of the first drive aggregate and in a second operating mode jointly by means of the first drive aggregate and the second drive aggregate, said hybrid drive device being further configured to adjust an actual rotational speed of the second drive aggregate to a target rotational speed with a predetermined rotational speed gradient when switching from the first operating mode to the second operating mode, said target rotational speed gradient being determined multiple times during different driving dynamic stages, thereby defining a first target rotational speed gradient assigned to a first driving dynamic stage, a second target rotational speed gradient assigned to a second driving dynamic stage and a third target rotational speed gradient assigned to a third driving dynamic stage, with the first target rotational speed gradient being smaller than the second target rotational speed gradient, and the second target rotational speed gradient being smaller than the third target rotational speed gradient and the first, second and third target rotational speed gradients differing between the first, second and third dynamic stages, and adjust the actual rotational speed to the target rotational speed to set a target torque at the second drive aggregate, said target torque being determined as a function of the predetermined rotational speed gradient by way of a feedback control, said feedback control including a pre-control in which the target torque of the second drive aggregate is determined as a function of an inertia moment of the second drive aggregate and the predetermined rotational speed gradient, wherein the feedback control includes at least one of a P-controlling element, an I-controlling element and a D-controlling element.

* * * * *